United States Patent [19]

Horikawa

[11] Patent Number: 4,543,476
[45] Date of Patent: Sep. 24, 1985

[54] FOCUS DETECTOR

[75] Inventor: Yoshiaki Horikawa, Hachioji, Japan

[73] Assignee: Olympus Optical Company, Ltd., Japan

[21] Appl. No.: 460,410

[22] Filed: Jan. 24, 1983

[30] Foreign Application Priority Data

May 10, 1982 [JP] Japan .................................. 57-77719

[51] Int. Cl.[4] ................................................. G01J 1/20
[52] U.S. Cl. ...................................... 250/201; 354/404
[58] Field of Search ...... 250/201 R, 201 AF, 201 PF, 250/201 DF, 204, 209; 356/125, 126, 1, 4; 354/404, 405, 406, 407; 350/331 R

[56] References Cited

U.S. PATENT DOCUMENTS

| 3,549,889 | 12/1970 | Akiyama | 250/201 |
| 3,765,765 | 10/1973 | Hefter | 250/201 |
| 3,815,982 | 6/1974 | Wagensonner | 350/331 R |
| 3,904,870 | 9/1975 | Stauffer | 250/204 |
| 4,005,443 | 1/1977 | Albrecht | 250/201 |
| 4,201,456 | 5/1980 | Wolbarsht | 354/404 |
| 4,445,029 | 4/1984 | Nagaoka et al. | 250/201 |

Primary Examiner—David C. Nelms
Attorney, Agent, or Firm—Ostrolenk, Faber, Gerb & Soffen

[57] ABSTRACT

A focus detector has a photoelectric position sensor which is disposed in a proper focal plane of light beams passing through a pupil splitter having two light transmitting sections which are controllable to be made transparent alternately in an image forming optical system. Output currents from two electrodes of the photoelectric position sensor are processed to derive a signal representing the center of gravity of an image on the position sensor.

The signal is compared with the control signal for making the two light transmitting sections transparent alternately for determining an in focus or an out of focus condition and a front focus or a rear focus based on magnitude and direction of change of the signal, respectively.

10 Claims, 9 Drawing Figures

FOCUS DETECTOR

BACKGROUND OF THE INVENTION

The present invention relates to a focus detector for use in optical systems, and more particularly, to a focus detector which detects the direction and magnitude of displacement of the focus of an optical system when out of focus, in response to relative changes in the positions between images produced by respective light beams which are obtained by splitting a pupil of the optical system when out of focus.

It is well recognized that images formed by respective light beams which are obtained by splitting a pupil of an optical system shift their relative positions in different directions. The principle of such a phenomenon will be described by way of an optical system shown in FIG. 1. In FIG. 1, which is a diagrammatic representation of an arrangement for detecting the focusing condition of an optical system, a blind 2 having an opening 2a is disposed adjacent to a pupil of a focusing lens 1 and a screen 3 is disposed in the rear of the lens 1.

If an in-focus condition is defined as the condition in which an image Q of an object (not shown) on the left of the lens 1 is formed on the screen 3 at Q', then blurred images $Q_1$ and $Q_2$, corresponding to a front focus and a rear focus condition, respectively, will be formed with respect to the image Q in positions shifted in opposite directions and along a direction perpendicular to an optical axis O when an out of focus condition exists. FIG. 1(b) shows the case where the opening 2a of blind 2 is shifted on the reverse side with respect to the optical axis O. While an image Q' is formed on the screen 3 when in focus condition exists, blurred image $Q_1'$ and $Q_2'$ corresponding to a front focus and a rear focus, respectively are formed on the screen 3 when an out of focus condition exists. Thus, when the opening 2a is moved from the position shown in FIG. 1(a) to the position shown in FIG. 1(b), for example, the images Q and Q' lie as in the same position when in focus condition exists, resulting in no displacement of the image. However, when in a rear focus condition an image displaces from the position $Q_1$ to $Q_1'$ and when in a front focus condition an image displaces from $Q_2$ to the position $Q_2'$. Consequently, when the displacement of blurred images as described above is detected electrically by arranging a photoelectric detector at screen 3, it is possible to construct a focus detector.

By way of example, an apparatus which uses the foregoing principle to detect an in-focus condition is disclosed in the Japanese patent publication No. Sho 56-13929 in which a one dimensional solid-state image sensor is employed as a photoelectric detector for detecting image information provided on a screen. With such apparatus, an analog or digital operation such as correlation is essential to obtain relative positions of images. It is necessary, therefore, to amend the relative positions of images because a difference in a light amount due to eccentricity and the like of a pupil affects the accuracy with which a phase shift can be detected. In this case, while the displacement in the relative position of images can be detected only in one direction, it is impossible to detect displacement in the direction perpendicular to the one direction. By way of example, it is impracticable to detect an in-focus condition for images which have a change of light intensity only in the perpendicular direction. Therefore, phase shifts of two dimensional images can be detected employing a two dimensional image sensor and splitting a pupil in two dimensions. It should be noted, however, that the computational amount for the two dimensions is greatly increased compared with the one dimension with the resultant difficulty of conducting the computation (due to increase in the computational amount substantially in proportion to the square of the dimensional number of plane).

SUMMARY OF THE INVENTION

In view of the foregoing, it is an object of the present invention to provide a focus detector with a simple construction and high accuracy which detects the magnitude and direction of a shift of a focus employing a photoelectric position sensor as a photoelectric detector.

According to the invention, it is possible to detect a front focus condition, a rear focus condition and magnitude of their shifts as well as to decide an in focus or out of focus condition utilizing the photoelectric position sensor. Therefore, unlike the case with a conventional charge coupled device type image sensor, there is no need of the storing period and the scanning period and it is possible to detect a focusing condition successively so that the detection time may be extremely reduced. Also, as apparent from the equation (8) which is described later, since measurement of the center of gravity of an image on the photoelectric position sensor is independent of the amount of incident light rays, the difference in brightness between respective detected images caused by unevenness of distribution of the light amount in a pupil due to its eccentricity and the like does not affect accuracy of the positional detection. Additionally, when constructed so as to detect the focusing condition in two dimension, it is possible to detect the focusing condition even for such an object monotonous along one direction as impossible or difficult to detect in one dimension. At this time, if a two dimensional photoelectric position sensor is utilized, a detected signal can be processed by a circuit with components the number of which is at most approximately twice as many as that in the case of one dimension. The invention has an effect as described above so that it is advantageously to provide an automatic focusing apparatus of a simple construction and high accuracy.

DESCRIPTION OF PREFERRED EMBODIMENTS

Figure 2:
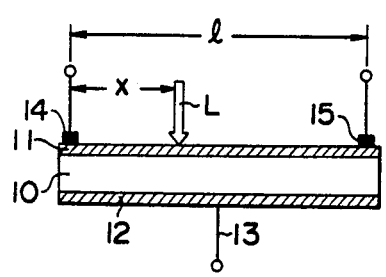
FIG. 2 is a schematic section view illustrating an example of a photoelectric position sensor for use in the invention.

FIG. 2 illustrates a basic structure of a photoelectric position sensor suitable for use in the present invention which applies the Lateral Photo Effect on a semiconductor surface and has a light receiving monolayer structure. Numeral 10 is a high resistance Si substrate, 11 is a p type resistor layer, 12 is an n+ layer and 13 is a common electrode. Numerals 14 and 15 are electrodes, surface layers of which have the photoelectric effect with the p-n junction. As shown, when light L impinges upon the p type resistor layer 11, output currents $I_A$ and $I_B$ are produced from the electrodes 14 and 15 in response to a light impinging position, respectively. Assuming that a distance and a resistance between the electrodes 14 and 15 are $l$ and $R_l$, respectively, a distance from the electrode 14 to the light impinging position and a partial resistance therebetween are x and $R_x$ respectively and a photocurrent produced by the impinged light is $I_O$, then $$I_A = \frac{R_l - R_x}{R_l} \cdot I_O, \quad I_B = \frac{R_x}{R_l} \cdot I_O \tag{1}$$

When the resistor layer 11 is uniform, the following equations can be obtained.

$$I_A = \frac{l-x}{l} \cdot I_O, \quad I_B = \frac{x}{l} \cdot I_O. \tag{2}$$

Therefore, using the output currents $I_A$ and $I_B$ of the electrodes 14 and 15 and processing the following relation $$\frac{I_A - I_B}{I_A + I_B} = \frac{l - 2x}{l}, \tag{3}$$

there will be given an incident energy or the light impinging position which is independent of an incident light amount, that is, a distance x. Here, the incident light amount is given by $$I_O = I_A + I_B. \tag{4}$$

Figure 3:
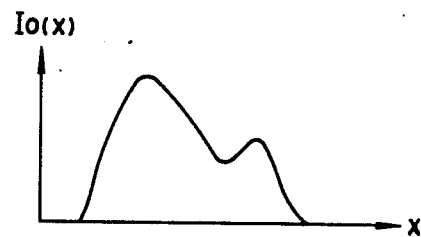
FIG. 3 is a diagram illustrating an example of distribution of the light amount incident upon the photoelectric position sensor.

While the above description relates to a one dimensional photoelectric position sensor, the same principle can be applied to a two dimensional photoelectric position sensor. Thus, when an image which has a light distribution on a photoelectric position sensor as shown in FIG. 3, for example, output currents $I_A(x)$ and $I_B(x)$ at the electrodes 14 and 15 produced by incident light having a light intensity distribution $I_O(x)$ at a distance x are given as follows.

$$I_A(x) = \frac{l-x}{l} I_O(x), \quad I_B(x) = \frac{x}{l} I_O(x) \tag{5}$$

The total output currents $I_A$ and $I_B$ from the electrodes 14 and 15 over the whole image are $$I_A = \int I_A(x)dx = \int I_O(x)dx - \frac{1}{l} \int I_O(x)xdx \tag{6}$$

-continued $$I_B = \int I_B(x)dx = \frac{1}{l} \int I_O(x)xdx. \tag{7}$$

From the equations (6) and (7), it follows that $$\frac{I_A - I_B}{I_A + I_B} = 1 - \frac{2}{l} \cdot \frac{\int I_O(x)xdx}{\int I_O(x)dx} \tag{8}$$

where $$\frac{\int I_O(x)xdx}{\int I_O(x)dx}$$

represents the center of gravity of a light intensity distribution of the image. Thus, it will be seen that the center of gravity of the image focused on the photoelectric position sensor can be obtained from the equation (8).

Figure 1:
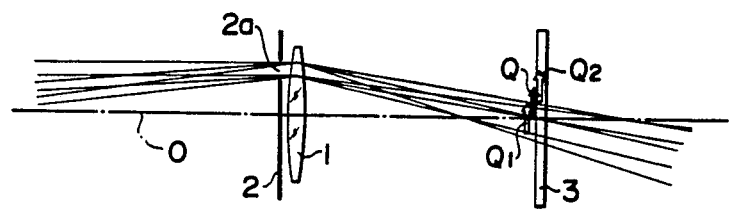
FIGS. 1(a) and 1(b) are diagrams illustrating the optical principle of a focus detection of the present invention.
Figure 1:
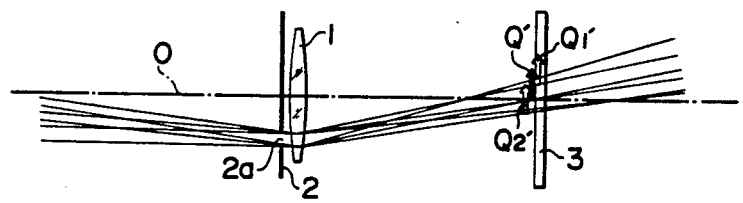
Figure 4:
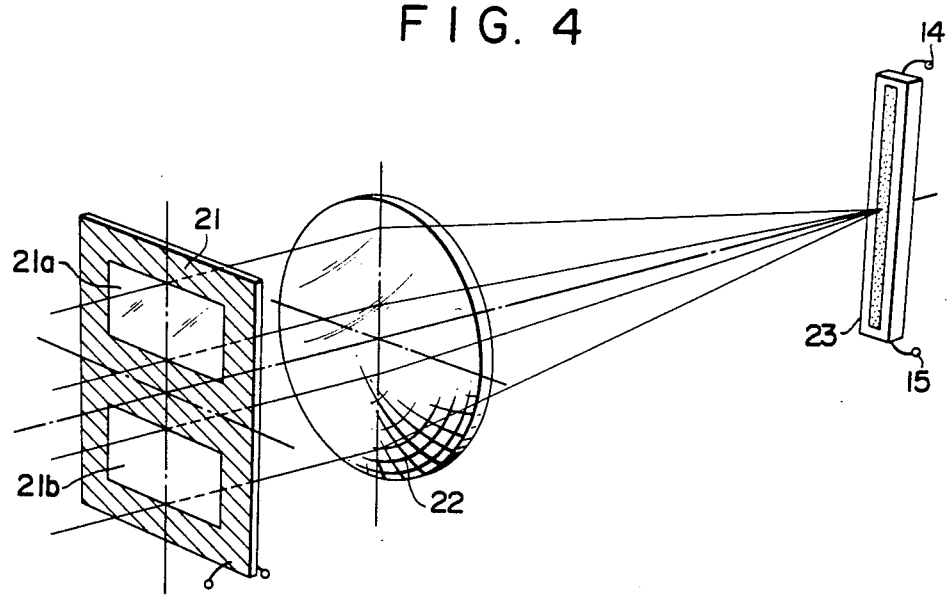
FIG. 4 is a perspective view illustrating an optical system of one dimensional focus detector according to the invention.
Figure 5:
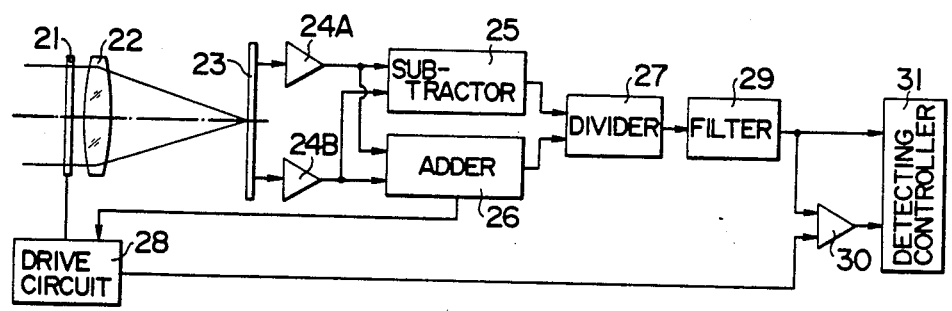
FIG. 5 is a block diagram of the focus detector shown in FIG. 4.
Figure 6:
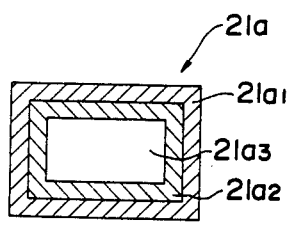
FIG. 6 is a plan view of another aspect of a light transmitting section of a pupil splitter.

A focus detector of the present invention which utilizes the photoelectric position sensor described above will be explained by way of an embodiment shown in FIGS. 4 and 5 in the following. Numeral 21 is a pupil splitter corresponding to the blind 2 in FIG. 1 which utilizes a liquid crystal or an electrochromic element and which has light transmitting sections 21a and 21b adapted to be controlled so as to become transparent alternately. Numeral 22 is a focusing lens and 23 is a one dimensional photoelectric position sensor (as shown in FIG. 2) which is disposed at the focal point of the lens 22. Light beams passing through the light transmitting sections 21a and 21b are focused on the sensor 23 through the lens 22. In FIG. 5, which is a block diagram of an electric circuit processing an output signal from the sensor 23, numerals 24A and 24B are amplifiers for amplifying output currents $I_A$ and $I_B$ from two electrodes of the sensor 23, 25 is a subtractor for obtaining $(I_A - I_B)$, 26 is an adder for obtaining $(I_A + I_B)$, 27 is a divider for processing the above equation (8) and 28 is a drive circuit for controlling the light transmitting sections of the pupil splitter 21 to make them transparent alternately. The drive circuit 28 delivers pulses simultaneously in synchronism with the control of the light transmitting sections to a discriminator 30 which will be described later, which pulses are at the (+) level when the section 21a is transparent and at the (−) level when the section 21b is transparent. Numeral 29 is a filter for removing a bias component from an output of the divider 27. The discriminator 30 decides between a front focus condition and a rear focus condition comparing a synchronized signal delivered from the drive circuit 28 with a detected signal delivered through the filter 29 from the divider 27. The brief description of the principle of discrimination used here is as follows. Referring to FIG. 4, there is assumed that an output of the divider 27 be on the (+) side when the center of gravity of an image on the photoelectric position sensor 23 is shifted upwardly. An output signal from the drive circuit 28 (hereinafter referred to as a signal A) is compared with an output from the divider 27 (hereinafter referred to as a signal B) which is in phase with the former. At this time, when the (+) side of signal A is in coincidence with the (+) side of signal B, the light transmitting section 21a is in a transparent condition and the image is shifted upwardly on the sensor 23, which indicates a condition of image $Q_2$ in FIG. 1(a). When the (+) side of signal A is in coincidence with the (−) side of signal B, the section 21a is transparent and the image is shifted downwardly on the sensor 23, which indicates a condition of image $Q_1$ in FIG. 1(a). Thus, the discriminator 30 is constructed so as to detect either of the two conditions. Numeral 31 is a detecting controller for detecting the focusing condition and delivering a signal to a display (not shown) or a drive circuit for a focusing lens (not shown). The detecting controller 31 detects the magnitude of shift from a focus in accordance with amplitude of signal B and determines the focusing condition based on a signal of either a front focus exists or a rear focus exists from the discriminator 30 to deliver a required signal to the display or the drive circuit for a focusing lens. By way of example, the focus detection can be performed by means of the detecting controller 31 using both an output from the discriminator 30 in which the output value 1 is produced when in a front focus condition exists and the output value 0 is produced when in a rear focus condition exists, for example, and amplitude of an output pulse from the divider 27 which amplitude is detected by the detecting controller 31. It is apparent that when an in focus condition exists, amplitude of signal B is substantially zero. Additionally, since the amount of incident light can be derived from an output of adder 26, it can be advantageously applied to an exposure meter. By way of example, it is possible, as seen from FIG. 5, to adjust a transmission factor of light transmitting sections 21a and 21b of the pupil splitter 21 by feeding an output of adder 26 back to the drive circuit 28 for enabling an automatic light amount adjustment. Alternatively, an automatic light amount adjustment may be performed by forming each light transmitting section 21a and 21b as shown in FIG. 6 and by controlling an opening area thereof. By way of example, section 21a is shown as being formed with three electrodes $21a_1$, $21a_2$ and $21a_3$ which are controlled to make light amount adjustments. In this case, if the section 21a is formed so that the centers of gravity of the openings under their open conditions are coincident with the same point, relations between shift of an image and shift of the focus are advantageously invariable.

According to the embodiment as described above, the focusing condition of optical systems is detected utilizing the photoelectric position sensor so that a focusing condition, that is, any of a front focus, a rear focus and an in-focus condition, and magnitude of a focus shift can be effectively determined with the simple construction. Also, it can be used for the coincidence type rangefinder.

Figure 7:
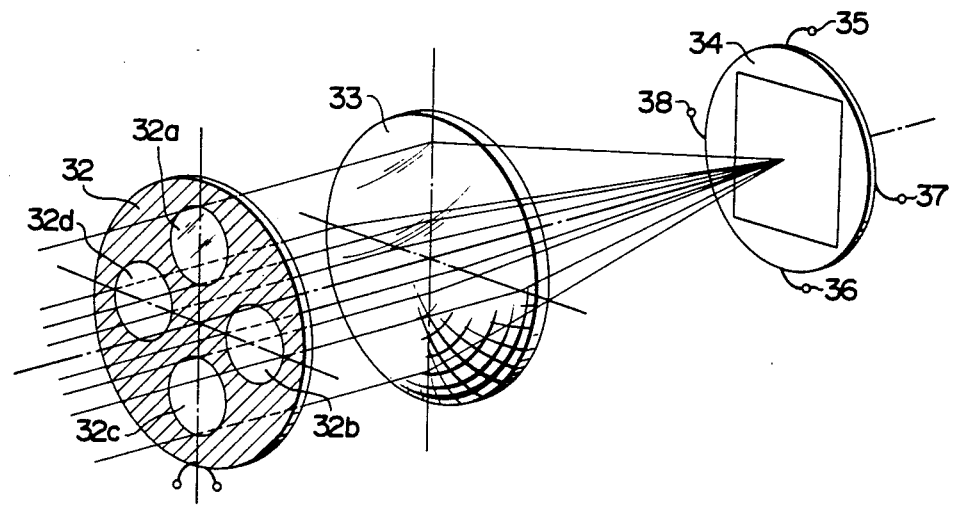
FIG. 7 is a perspective view illustrating an optical system of two dimensional focus detector according to the invention.
Figure 8:
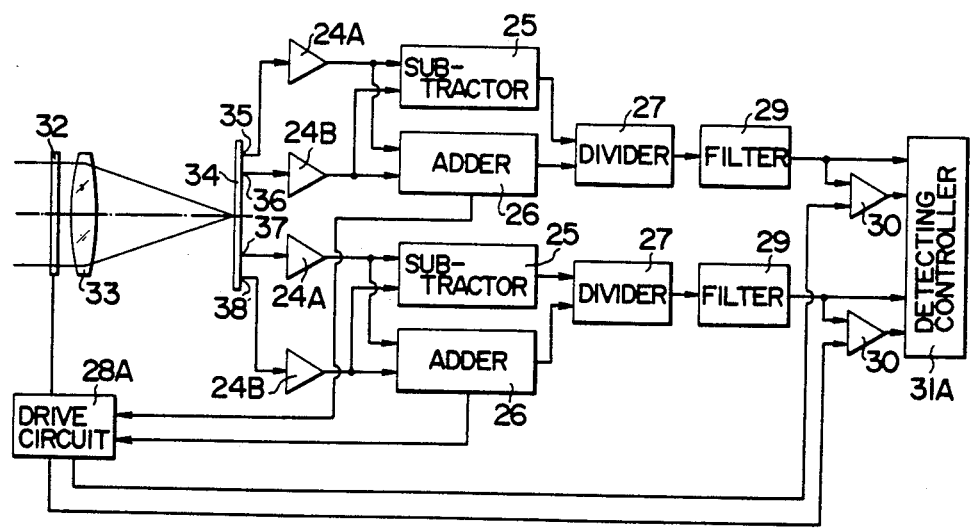
FIG. 8 is a block diagram of the foucs detector shown in FIG. 7.

FIGS. 7 and 8 show another embodiment in which focus detections in two directions perpendicular to each other are performed utilizing a two dimensional photoelectric position sensor. Referring to FIG. 7, numeral 32 is a pupil splitter similar to pupil splitter 21 in FIG. 4 which has light transmitting sections 32a, 32b, 32c and 32d which are controllable so as to be made transparent successively. Numeral 33 is a focusing lens identical with the focusing lens 22 in FIG. 4 and 34 is a two dimensional photoelectric position sensor which is disposed in the focus position of lens 33 and is provided with electrodes 35 and 36 for detection in the vertical direction and electrodes 37 and 38 for detection in the horizontal direction. Referring to FIG. 8, which is a block diagram of electric circuits for processing an output signal from the sensor 34, like components shown in FIG. 4 are identified by the same reference characters and therefore their description will be omitted. Output currents from electrodes 35 and 36 of two dimensional position sensor 34 in the vertical direction and output currents from electrodes 37 and 38 in the horizontal direction are processed by like circuits shown in FIG. 4, respectively, and by a common drive circuit 28A and a common detecting controller 31A. The drive circuit 28A produces pulses in synchronism with the action of light transmitting sections 32a and 32c of pupil splitter 32 and pulses in synchronism with the action of light transmitting sections 32b and 32d. The detecting controller 31A detects the focusng condition in each of the vertical and the horizontal directions to deliver a proper signal to a display or a drive circuit for driving the focusing lens (not shown).

The operation of the second embodiment is that the operation of the embodiment shown in FIG. 4 are applied in two dimensions, namely, vertical and horizontal directions so that it is possible to detect the focusing condition, namely, one of a front focus, rear focus and in-focus as well as the magnitude of focus shift with respect to the two dimensions with a simple construction. Therefore, it should be understood that the detection even for an object monotonous in one direction is neither impossible nor difficult.

A light transmitting section of a pupil splitter may be formed so as to close or open it mechanically. It will be understood that when an automatic focusing operation is effected in an optical instrument such as a microscope with a movable stage, such a stage rather than a focusing lens may be driven for adjustment by a control circuit for focusing.

What is claimed is:
1. A focus detector, comprising
   an imaging lens;
   light path selecting means for permitting light from an object to alternately pass through different first and second regions of said imaging lens;
   photoelectric transducer means having a light receiving monolayer disposed in a predetermined imaging plane of said imaging lens for receiving the light passing through said first and second regions;
   circuit means for forming a signal from an output of said transducer means representing the center of gravity of a light intensity distribution impinging upon said light receiving monolayer, said center of gravity signal having first and second polarities, associated respectively, with the condition when said light is focused in front and in the rear of said light receiving monolayer;
   light path indication means for producing a light path signal having a first predetermined level when said light passes through said first region and a second predetermined level when said light passes through said second region;
   discriminator means responsive to said light path signal and to said signal representing the center of gravity for producing a focusing sense signal having a first level to indicate a front focus condition and a second predetermined level to indicate a rear focus condition, said focusing sense signal being produced by correlating said polarity of said center of gravity signal with said first and second predetermined levels of said light path signal and
   focusing correction means responsive to said focusing sense signal and to said center of gravity signal for detecting whether said front or rear focus conditions exists when the light path is switched between said first region and said second region and for producing a control signal based on the change in magnitude of said signal for controlling said imaging lens to produce an in focus condition.

2. A focus detector according to claim 1 in which the light path selecting means comprises a pupil splitter which has two light transmitting sections forming said first and second regions, respectively, which are alternately made transparent, said pupil splitter being disposed adjacent to said imaging lens and drive means for controlling said two light transmitting sections so as to alternately make them transparent.

3. A focus detector according to claim 2 in which the pupil splitter is formed by a liquid crystal, electrochromic element.

4. A focus detector according to claim 3, in which the pupil splitter permits the amount of light passing through its light transmitting section to be automatically adjusted by feeding a signal indicative of the incident light amount from said circuit means back to said drive means.

5. A focus detector according to claim 4 in which each light transmitting section of the pupil splitter is formed by a plurality of openings having the same shape but different areas with the centers of these openings in coincidence, to enable an automatic adjustment of the light amount by controlling which of the openings is enabled.

6. A focus detector according to claim 1 in which the photoelectric transducer means is formed by a photoelectric position sensor having two electrodes aligned in a direction which is not perpendicular to a line connecting the center of said first region with that of said second region.

7. A focus detector according to claim 1 in which the transducer means has first and second electrodes connected to opposite ends of the photoelectric transducer and in which the circuit means derives the center of gravity of an image on the light receiving surface of said transducer means and delivers a second signal indicative of the difference between the outputs from said electrodes divided by the sum of the outputs from said electrodes.

8. A focus detector according to claim 7 in which the second signal from said circuit means is at the one polarity when the center of gravity of an image on the photoelectric transducer shifts upward and is at the opposite polarity when the center of gravity shifts downward.

9. A focus detector according to claim 1 in which the discriminator means produces an output signal which has one of the values 1 or 0 when a front focus condition exists and has the other of the values 1 or 0 when a rear focus condition exists.

10. A two dimensional focus detector, comprising:
an imaging lens;
light path selecting means for permitting light from an object to alternately pass through first and second regions of said imaging lens and to alternately pass through third and fourth regions of said imaging lens, each of said regions being different from one another, said first and second regions lying along a first direction which is perpendicular to a second direction along which said third and fourth regions lie;
photoelectric transducer means having first and second light receiving monolayers lying in said first and second directions, respectively, said transducer means being disposed in a predetermined imaging plane of said imaging lens for receiving the light passing through said first and second and said third and fourth regions, respectively;
first and second sets of circuit means for forming first and second signals from respective outputs of said transducer means, said first and second signals representing the center of gravity of the light intensity distribution impinging upon said first and second monolayers, respectively, each one of said center of gravity signals having first and second polarities, associated respectively with the condition when said light is focused in front and in the rear of said light receiving monolayers;
first and second sets of light path indication means for producing first and second light path signals, each said light path signal having a first predetermined level when said light passes, respectively, through said first and third regions and a second predetermined level when said light passes, respectively, through said second and fourth regions;
first and second sets of discriminator means responsive, respectively, to said first and second light path signals and to said first and second center of gravity signals for producing, respectively, first and second focusing sense signals having a first level to indicate a front focus condition and a second predetermined level to indicate a rear focus condition, said first and second focusing sense signals being produced by correlating said polarities of said center of gravity signals with said first and second levels of said light path signals; and
focusing correction means responsive to said first and second focusing sense signals and to said first and second center of gravity signals for detecting whether said front or rear focus conditions exists when the light path is changed between said first and second, and between said third and fourth regions, respectively, and for producing a control signal based on the change in magnitude of said first and second center of gravity signals for controlling said imaging lens to produce an in focus condition.

* * * * *